Figure 1:
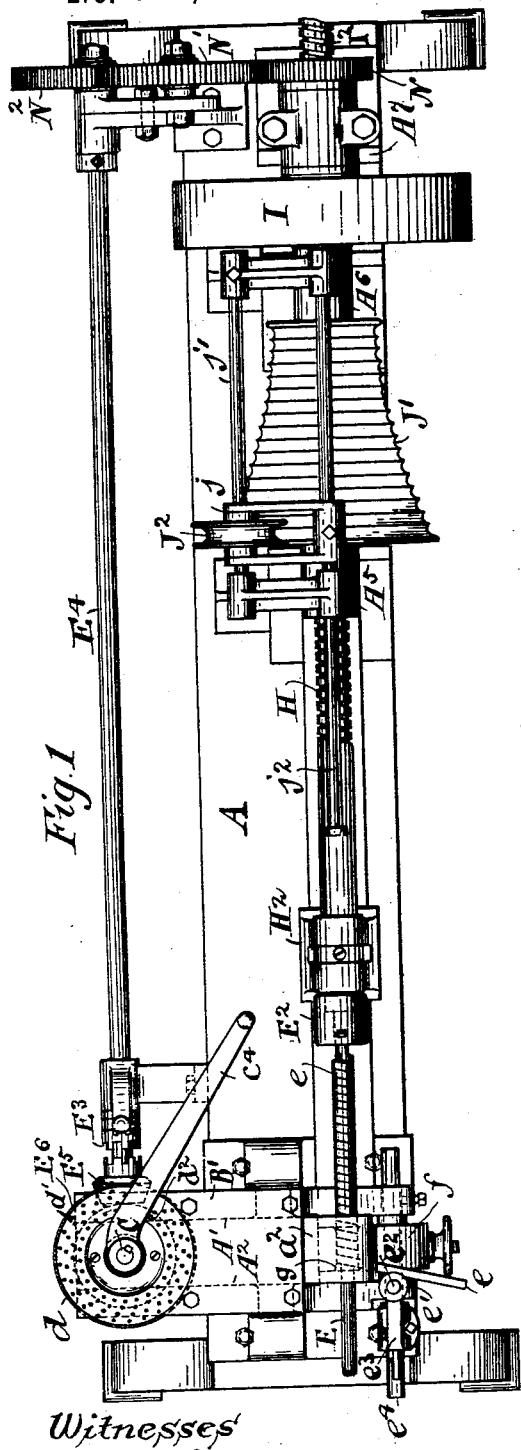

(No Model.)

J. W. HYATT.
APPARATUS FOR MAKING HELICAL SPRING ROLLERS.

No. 587,582. Patented Aug. 3, 1897.

Witnesses  
a. M. Jones.  
Geo. Wadman.

Inventor  
John W. Hyatt,  
Per Edw. E. Lumby,  
Atty.

(No Model.)  5 Sheets—Sheet 2.
J. W. HYATT.
APPARATUS FOR MAKING HELICAL SPRING ROLLERS.
No. 587,582.  Patented Aug. 3, 1897.
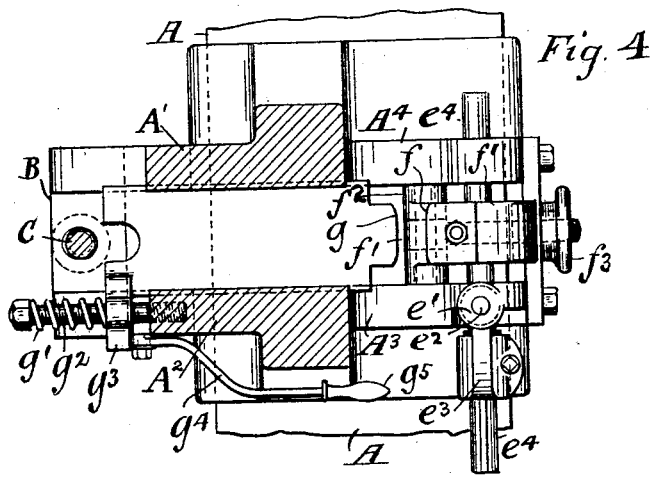
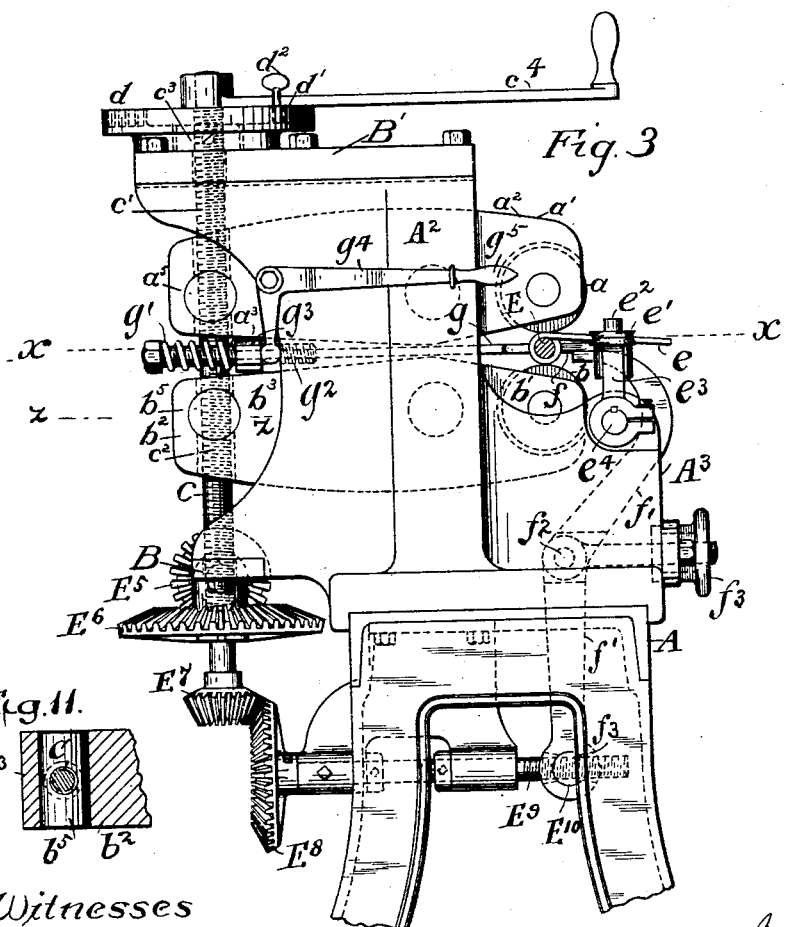
Witnesses
A. M. Jones.
Geo. Wadman
Inventor
John W. Hyatt,
Per Edw. E. Quincy.
Atty.

(No Model.)
5 Sheets—Sheet 3.
J. W. HYATT.
APPARATUS FOR MAKING HELICAL SPRING ROLLERS.
No. 587,582. Patented Aug. 3, 1897.
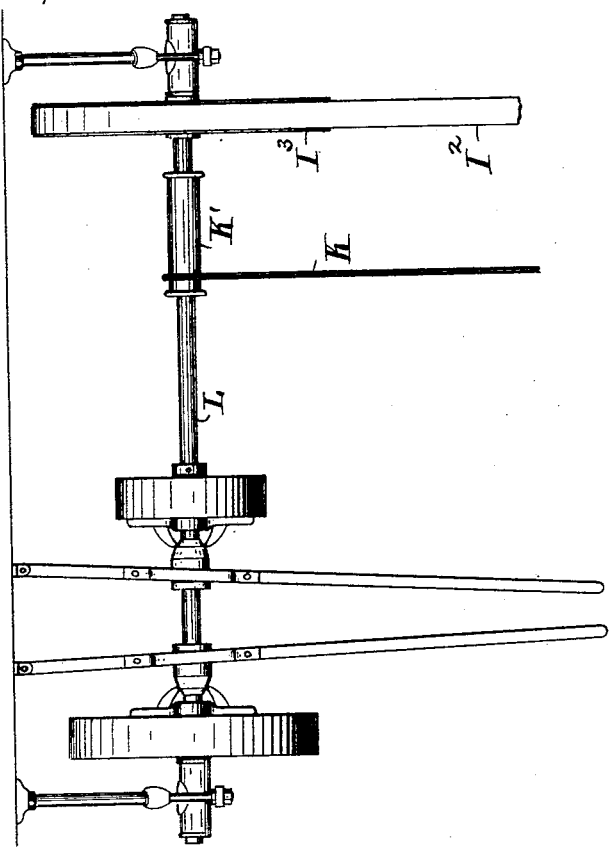
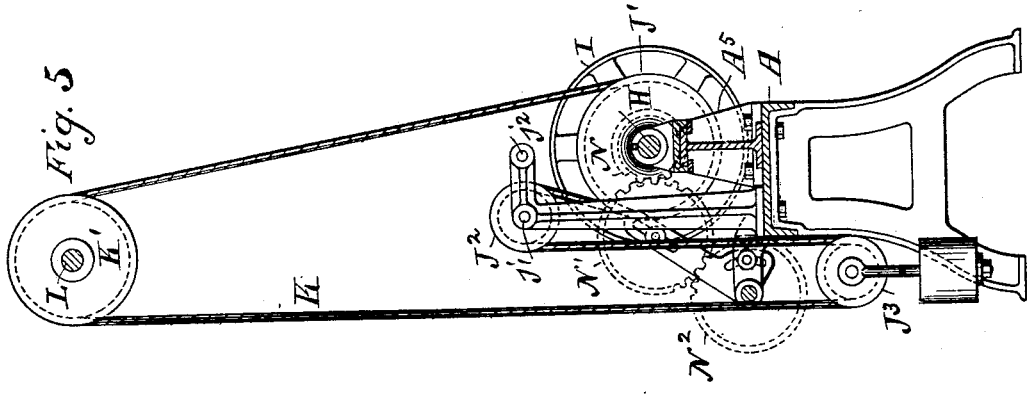
Witnesses
A. M. Jones.
Geo. Wadman
Inventor
John W. Hyatt,
Per Edw. E. Quimby,
Atty.

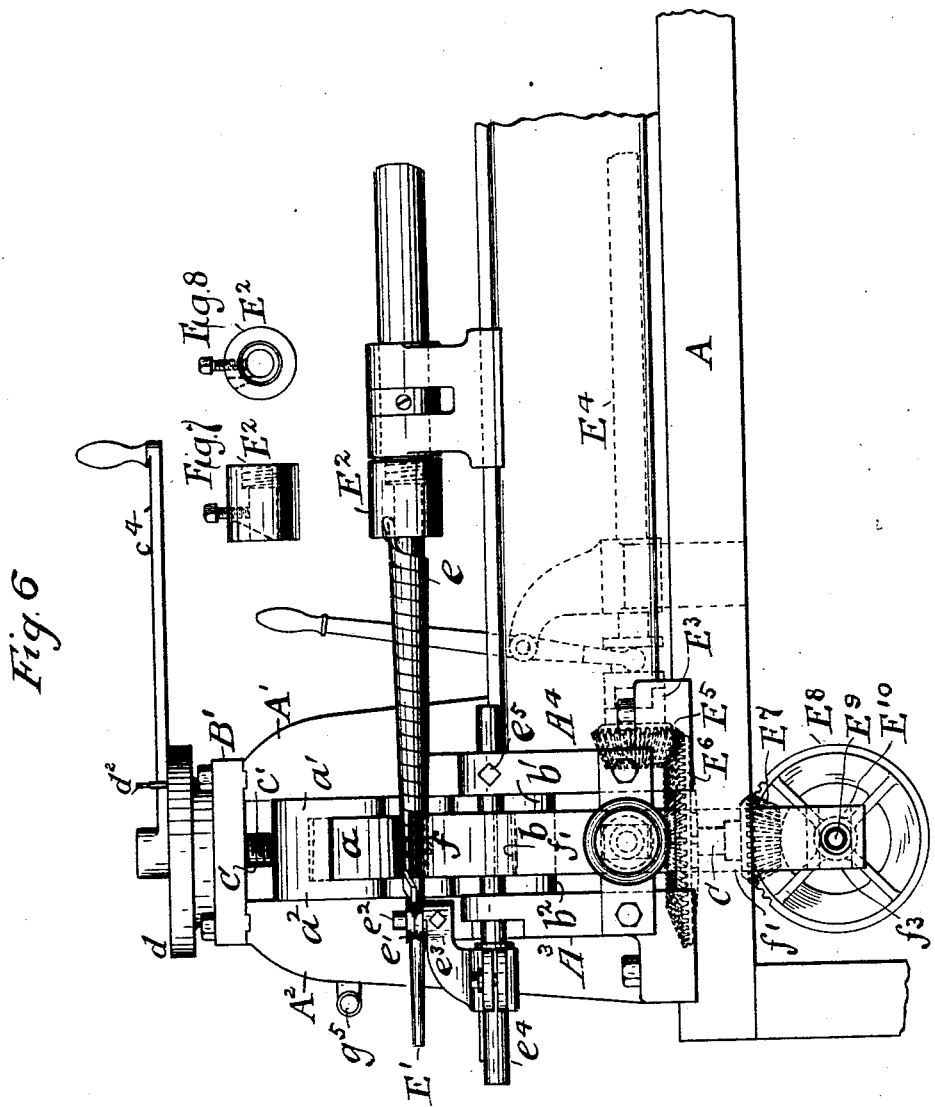

UNITED STATES PATENT OFFICE.

JOHN W. HYATT, OF NEWARK, NEW JERSEY, ASSIGNOR TO THE HYATT ROLLER BEARING COMPANY, OF HARRISON, NEW JERSEY.

APPARATUS FOR MAKING HELICAL SPRING-ROLLERS.

SPECIFICATION forming part of Letters Patent No. 587,582, dated August 3, 1897.

Application filed January 25, 1897. Serial No. 620,548. (No model.)

*To all whom it may concern:*

Be it known that I, JOHN W. HYATT, of Newark, New Jersey, have invented certain Improvements in Apparatus for Manufacturing Helical Spring-Rollers, of which the following is a specification.

The object of this invention is the production of helical spring-rollers, either cylindrical or tapering, of accurately-prescribed diameters, adapting them for use in roller-bearings.

The apparatus embodying the improvements embraces, essentially, a mandrel, means for rotating said mandrel and for feeding it endwise, a plurality of rolls adapted to rotate in axially-parallel or approximately parallel bearings on opposite sides of said mandrel and so mounted as to leave the space between the rolls and the mandrel unobstructed at both ends, and means for holding upon said mandrel one end of a ribbon of steel, whereby said ribbon, fed at the desired angle into the space between one side of said mandrel and the roll adjacent thereto, is wound helically around the mandrel as upon a core and while being thus wound is subjected simultaneously to two modes of action, to wit: the cross-rolling action of the rolls and the drawing action resulting from the endwise progression of the work through the space between the rolls, as the result of which the finished helix is symmetrically rounded and reduced with great accuracy to the desired diameter or conicity and has a smooth exterior surface.

If a tapering helix is to be made, a conical mandrel is employed and the rolls are fed bodily toward the mandrel as the diameter of the helix in process of formation decreases.

Figure 2:
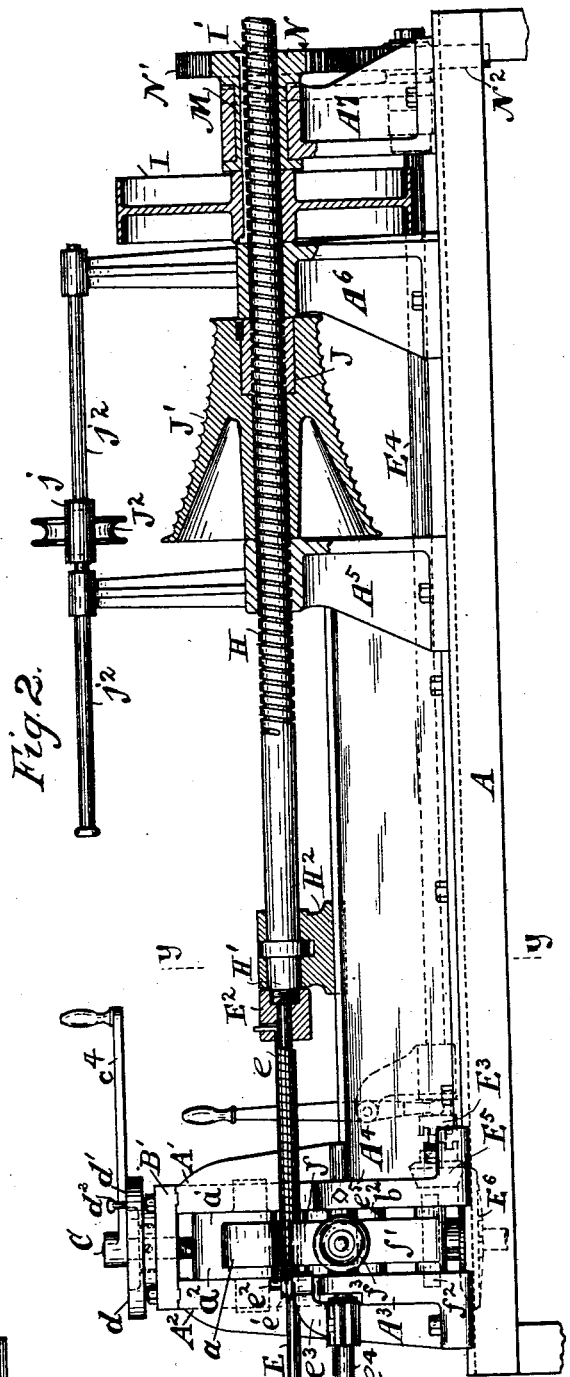
Figure 10:
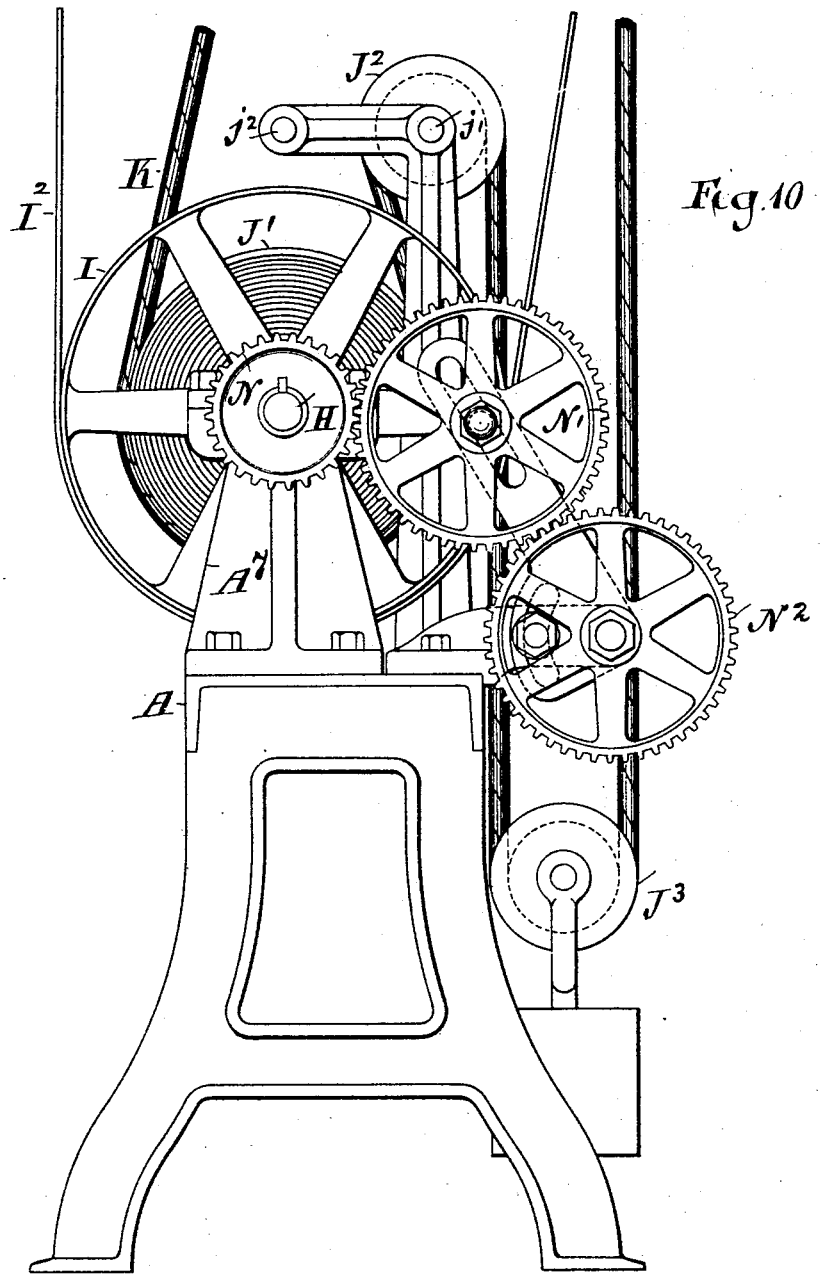

The accompanying drawings of an apparatus embodying the invention are as follows:

Figure 1 is a top view. Fig. 2 is a side elevation, partly in vertical section. Fig. 3 is a rear elevation. Fig. 4 is a horizontal section taken through the plane indicated by the dotted line $x\,x$ on Fig. 3. Fig. 5 is a transverse vertical section taken through the plane indicated by the dotted line $y\,y$ on Fig. 2. Fig. 6 is a side elevation of a portion of the apparatus, illustrating the use of conical rolls in connection with a conical core for the production of a tapering spiral spring-roller. Figs. 7 and 8 are respectively side and end elevations of a form of chuck adapted to be secured to the mandrel or core E and to be employed for holding the end of the steel ribbon during the process of winding. Fig. 9 is a view of the counter-shaft and its appurtenances, showing the pulleys from which power is taken to drive the machine. Fig. 10 is a front end elevation showing the manner in which the change-gearing is arranged. Fig. 11 is a horizontal section taken through the plane indicated by the dotted line $z\,z$ on Fig. 3.

The apparatus represented in the drawings may for the purpose of description be deemed to consist of two parts—first, the cross-rolling mechanism embracing the rolls and their appurtenances, and, secondly, the mechanism for simultaneously imparting rotation and a prescribed extent of endwise progression to the work subjected to the action of the rolls. These mechanisms are erected upon a substantial table A, provided with the necessary standards for supporting the moving and adjustable parts.

In the illustration of the invention embodied in the apparatus shown in the drawings there are employed two rolls $a$ and $b$. The upper roll $a$ is adapted to rotate in bearings formed in the shorter arm $a'$ of the rocking lever $a^2$, pivotally mounted upon the standards $A'\,A^2$. The longer arm $a^3$ of the lever $a^2$ is provided with a transverse perforation $a^4$, affording a loose bearing for the nut $a^5$. The nut $a^5$ has the form of a short cylinder with a transverse perforation which is appropriately screw-threaded to adapt it for engaging the vertical adjusting screw-bolt C. The lower roll $b$ is adapted to rotate in bearings formed in the shorter arm $b'$ of the rocking lever $b^2$, also pivotally mounted upon the standards $A'\,A^2$. The longer arm $b^3$ of the lever $b^2$ carries a nut $b^5$, which is similar in construction to the nut $a^5$. The longer arms $a^3$ and $b^3$ of the levers $a^2$ and $b^2$ are vertically bored to admit of the loose extension through them of the adjusting screw-bolt C.

The upper part of the adjusting screw-bolt C is provided with a right-hand screw-thread $c'$ for engaging the corresponding thread of the nut $a^5$, and a lower part of the adjusting screw-bolt is provided with a left-hand screw-thread $c^2$ for engaging the corresponding screw-thread of the nut $b^5$. The adjusting screw-bolt C is provided with a lower bearing in the plate B, bolted to wings projecting laterally from the standards $A'$ $A^2$ and with an upper bearing in the cap $B'$, bolted to the tops of the standards $A'$ $A^2$ and extending across the space between them. The screw-thread $c'$ extends to the upper extremity of the bolt C, and above the cap $B'$ the bolt has pinned to it the collar $c^3$, by means of which the bolt C is suspended upon the cap $B'$. The upper extremity of the bolt C has affixed to it the crank $c^4$, by means of which the bolt C may be turned manually for the purpose of adjusting the distances between the rolls $a$ and $b$, as may be required. For the purpose of exactly measuring the extent of such adjustment there is secured to the top of the cap $B'$ an annular dial $d$, over the perforated face $d'$ of which the arm of the crank $c^4$ traverses.

As represented in the drawings, the apertures in the dial are arranged spirally in twenty-five groups of four each. A detachable pin $d^2$, adapted to be inserted in the apertures in the dial, is made to serve as a stop for arresting the rotating movement of the arm of the crank $c^4$. The perforations in the dial are so arranged that when the arm has been brought to rest by collision with the stop-pin $d^2$ the removal of the pin to the next adjoining perforation permits the crank-arm and the adjusting-bolt C to turn a distance equal to one one-hundredth of a revolution. Assuming the pitch of the threads $c'$ and $c^2$ of the adjusting-bolt to be ten to the inch, one revolution of the adjusting-bolt will move the rolls $a$ and $b$ either toward or from each other, according to the direction in which the adjusting-bolt C is rotated, to such extent as will vary the distance between the working faces of the rolls exactly one-tenth of an inch, each roll being moved a distance of one-half of one-tenth of an inch. Hence by turning the crank-arm one one-hundredth part of a revolution the distance between the rolls $a$ and $b$ will be increased or diminished, as the case may be, one one-thousandth of an inch. This capacity of nice adjustment of the rolls $a$ and $b$ is provided for the purpose of enabling the machine to finish or calender the work to a prescribed diameter or conicity with perfect exactness, it being important that helical spring-rollers intended for roller-bearings shall be so made that they will accurately fit their allotted parts of the space between the axle and the inner face of the axle-box in connection with which they are to be employed.

The spiral springs are formed by progressively winding upon the core or mandrel E a flat steel ribbon $e$. The steel ribbon is fed into the space between the top of the core and the bottom of the roll $a$ at such an angle as may be required by the pitch which it is intended the spiral shall have. To facilitate the guiding of the ribbon in feeding it, there is employed the guide-roll $e'$, loosely mounted upon the stud $e^2$, projecting vertically upward from the curved arm $e^3$, which is clamped upon the guide-bar $e^4$ in such wise as to be adjustable thereon. The guide-bar $e^4$ is loosely mounted in bearings formed in the wings $A^3$ and $A^4$ of the standards $A'$ $A^2$, and by means of a set-screw $e^5$ is fastened in any desired position. By this construction the guide-roll $e'$ is susceptible of adjustment in a path parallel with the longitudinal axis of the core, and hence may be adjusted with reference to feeding the steel ribbon at any desired angle.

During the winding operation the steel ribbon exerts a laterally outward strain upon the part of the core or mandrel upon which it is being wound. This strain is effectively resisted by the front rest $f$, which presents a rigid bearing for the outer side of the work. If desired, there may also be employed the back rest $g$ for bearing upon the inner side of the work with an elastic pressure, due to the resilient force of the expanding spiral spring $g'$ abutting at its outer end against the head of the bolt $g^2$, screwed into the standard $A^2$, and delivering its thrust against the perforated arm $g^3$, projecting laterally from the rear end of the back rest $g$. The front rest $f$ is affixed to the upper end of a lever $f'$, pivotally supported upon a fulcrum $f^2$, which is horizontally adjustable by means of the adjusting-nut $f^3$.

When a spiral spring-roller of uniform diameter is being wound, the arm $f'$ is so adjusted as to keep the front rest stationary in the desired position. In starting the winding operation the rear rest $g$ is pushed backward to allow the steel ribbon to be wound upon the part of the core immediately opposite to it and is then released to the action of its spring $g'$.

To facilitate the required manipulation of the back rest $g$ when the winding operation is to be begun, there is provided the bell-crank lever $g^4$, the extremity of the shorter arm of which bears against the side of the arm $g^3$, while the longer arm is provided with the handle $g^5$.

Preparatory to the winding operation one end of the steel ribbon is inserted in the chuck $E^2$ and is thereby held upon and made to rotate with the mandrel. At the time when the winding operation begins the chuck $E^2$ occupies a position in proximity to the rolls $a$ and $b$, which are separated by suitably turning the crank-arm $c^4$ in such wise as to make them bear upon opposite sides of the work. The chuck and mandrel are then rotated and at the same time drawn gradually away from the rolls $a$ and $b$.

When a tapering spring-roller is to be formed, there is employed a conical mandrel $E'$, an illustration of which is afforded in Fig. 6.

For winding a tapering spring-roller the rolls $a$ and $b$ are preferably made slightly conical, as illustrated in Fig. 6, and, as the winding operation proceeds, are made to approach each other at a rate corresponding with the progressive reduction in the diameter of the work. The clutch $E^3$ is so actuated as to connect the rotating horizontal shaft $E^4$ to the bevel-pinion $E^5$, which meshes with the bevel-gear $E^6$, affixed to the lower part of the adjusting screw-bolt C. The adjusting screw-bolt C is thereby rotated in such direction as to rock toward each other the shorter arms $a'$ $b'$ of the rocking levers $a^2$ $b^2$, in which the rolls $a$ and $b$ are mounted. At the same time motion is communicated by means of the bevel-pinion $E^7$ upon the lower extremity of the adjusting screw-bolt C to the bevel-gear $E^8$, affixed to the shank of the horizontal screw-bolt $E^9$, the screw-threaded part of which engages a nut $E^{10}$, contained in the lower end $f^3$ of the lever $f'$. Rotation is thus communicated to the screw-bolt $E^9$ in such direction as to rock the front rest $f$ toward the core with a speed corresponding to the gradual diminution in diameter of the core as the winding operation proceeds. The back rest $g$ at the same time maintains its bearing upon the inner side of the work.

When the steel ribbon is being wound into a helix of gradually-diminishing diameter, the edge of the ribbon toward the larger end of the mandrel bears forcibly against the edge of the adjacent finished convolution and is prevented from overriding the adjacent finished convolution by the compressive action of the roll which holds it against the surface of the mandrel.

The mechanism for simultaneously rotating the mandrel and effecting a prescribed extent of endwise progression to the work consists of a horizontal feed screw-bolt H, provided with stationary bearings in the standards $A^5$ $A^6$ $A^7$, and having its inner end H' provided with a bearing in the horizontally-sliding carriage $H^2$.

The inner end H' of the horizontal feed screw-bolt is centrally tapped to receive the end of the mandrel and is provided with an external screw-thread for the attachment of the chuck $E^2$. Rotation is imparted to the horizontal feed screw-bolt H by the driving-pulley I, which is loosely splined to the bolt H by means of the key I', connected to the hub of the pulley I and adapted to slide loosely in the longitudinal groove $I^2$ in the screw-bolt H. The extent of endwise movement of the screw-bolt H is governed by the speed of rotation of the nut J, secured to one end of the hub of the cone-pulley J', the cone-pulley J' being incapable of any endwise movement by reason of the bearing of the opposite ends of its hub against the standards $A^5$ and $A^6$.

It will be perceived that if the cone-pulley J' should be rotated at the same speed as the screw-bolt H the latter would have no endwise movement, but by rotating the cone-pulley at a different speed a greater or less range of endwise movement is given to the feed screw-bolt H, according to the greater or less difference in the speeds of rotation of the cone-pulley J' and screw-bolt H.

The cone-pulley is rotated by the cord or band K, driven by the elongated pulley K' on a suitably-placed counter-shaft L. The driving band or cord K extends downward from the pulley K' to the cone-pulley J', and, passing around the under side of the cone-pulley J', is led over the guide-pulley $J^2$, thence downward around the under side of the weighted tightener-pulley $J^3$, and upwardly therefrom to the driving-pulley K'. The guide-pulley $J^2$ is mounted in the shifter-carriage $j$, adapted to slide on the horizontal bar $j'$, and secured to the horizontally-sliding shifter-bar $j^2$, by the manipulation of which the cord or band K may be shifted from either one to another of the grooves in the periphery of the cone-pulley J'. The driving-pulley I is rotated by the driving-belt $I^2$ from the pulley $I^3$ on the counter-shaft L.

A thimble M, flanged at both ends, loosely surrounds the screw-bolt H and is journaled in a bearing afforded for it in the standard $A^7$. The key I' extends through the hub of the driving-pulley I, through the thimble M, and through the hub of the pinion N, from which motion is transmitted through the change-gears N' $N^2$ to the horizontal shaft $E^4$, which, when the clutch $E^3$ is appropriately manipulated, acts through the bevel-gears $E^5$ and $E^6$ to impart the rotating motion to the vertical feed screw-bolt C, by means of which the rolls $a$ and $b$ are made to appropriately change their positions with relation to the mandrel in conformity with the progressive changes in the diameter of the work.

What is claimed as the invention is—

1. In a machine for forming helical spring-rollers, the combination, as herein set forth, of a mandrel; means for rotating the said mandrel upon its longitudinal axis, and means for feeding it endwise; a plurality of rolls on opposite sides of said mandrel and adapted to rotate in bearings axially parallel, or approximately parallel, with the longitudinal axis of said mandrel, and so mounted as to leave the space between the rolls and said mandrel unobstructed at both ends; means for holding upon said mandrel one end of a ribbon of steel, whereby said ribbon when fed at a prescribed angle into the space between one side of said mandrel and the roll adjacent thereto, is wound spirally around said mandrel as upon a core, and while being thus wound is subjected simultaneously to the cross-rolling action of the rolls and to the drawing action resulting from the endwise progression of the work through the space between the rolls.

2. In a machine for forming helical spring-rollers, a mandrel; means for rotating said mandrel upon its longitudinal axis and for simultaneously imparting to it a prescribed speed of endwise motion, in combination with a plurality of rolls adapted to rotate in bearings axially parallel or approximately parallel with the longitudinal axis of said mandrel, and means for simultaneously moving each of said rolls to a like extent toward or from the center of said mandrel for the purpose of accurately preserving the centralization of the work with relation to said rolls while a steel ribbon is in process of being wound spirally around said mandrel.

3. In a machine for forming helical spring-rollers, a tapering mandrel; means for rotating said mandrel upon its longitudinal axis and for simultaneously imparting to it a prescribed speed of endwise motion; means for holding upon said mandrel one end of a steel ribbon; rolls on opposite sides of said mandrel for cross-rolling a ribbon of steel in process of being wound around said mandrel, and means for automatically varying the distance between the said rolls to an extent corresponding to the variations in the diameter of the work during the progressive winding of the steel ribbon spirally around the tapering mandrel.

4. In a machine for progressively winding a ribbon of steel spirally around a tapering mandrel rotating upon its longitudinal axis and having an endwise-feeding movement, and employing rolls for cross-rolling the steel ribbon in process of being wound; bearings for said rolls arranged in the free ends of arms adapted to rock on parallel horizontal axes and provided at their ends opposite those carrying the rolls with suitable nuts; a vertical feed screw-bolt having a right-hand thread engaging the nut in one of said arms and a left-hand thread engaging the nut in the other of said arms; gearing for transmitting from the main shaft of the machine motion to rotate said feed screw-bolt at such prescribed rate of speed as may be required to gradually vary the distance between said rolls in conformity with the variations in the diameter of the work, during the progressive winding of said steel ribbon spirally around said tapering mandrel.

5. In a machine for forming helical spring-rollers, an endwise moving and rotating mandrel; a chuck for holding one end of a steel ribbon upon said mandrel; rolls for bearing on opposite sides of the steel ribbon in process of being wound spirally around said mandrel, in combination with an adjustable rest for presenting a rigid bearing for the outer side of the work, substantially as set forth.

6. In a machine for forming helical spring-rollers, an endwise moving and rotating tapering mandrel; a chuck for holding one end of a steel ribbon upon said mandrel; rolls for bearing on opposite sides of the steel ribbon in process of being wound spirally around said mandrel; means for gradually varying the distance between said rolls in conformity with the progressive variation in the diameter of the work; a yielding rest adapted to bear with an elastic pressure upon one side of the work; a rest for bearing rigidly upon the opposite side of the work, and means for gradually varying the distance from the center of the mandrel of said rigidly-bearing rest in appropriate conformity with the variations in the diameter of the part of the mandrel between the rolls during the endwise movement of the mandrel and the progressive winding of said steel ribbon spirally around said mandrel.

7. In a machine for forming helical spring-rollers, a rotating, endwise-moving mandrel; a chuck for holding one end of a steel ribbon upon said mandrel; rolls upon opposite sides of said mandrel for bearing upon the steel ribbon in process of being wound spirally around said mandrel; arms rocking on parallel horizontal axes carrying said rolls in their free ends, and provided at their opposite ends with suitable nuts; a vertical feed screw-bolt provided with a right-hand screw-thread for engaging the nut in one of said arms, and a left-hand screw-thread for engaging the nut in the other of said arms; in combination with a fixed horizontal dial provided with a central aperture for admitting the upper end of said feed screw-bolt, and provided with a system of spirally-arranged holes; a crank-arm affixed to the upper end of the said vertical feed screw-bolt adapted to swing over the face of said dial and a removable stop-pin for insertion in either of said spirally-arranged holes for the purpose of definitely limiting the range of such swinging movement of said crank-arm, substantially as set forth.

8. In a machine for forming helical spring-rollers, the combination, as herein set forth, of an endwise-moving rotating mandrel; means for holding one end of a ribbon of steel upon said mandrel; a plurality of rolls for cross-rolling a ribbon of steel in the act of being wound spirally around said mandrel; means for varying the speed of endwise movement of said mandrel and the work thereon, the same consisting of a horizontal feed screw-bolt in axial alinement with said mandrel, and to the end of which said mandrel is affixed a driving-pulley loosely splined to said horizontal feed screw-bolt, and a cone-pulley having secured in its hub a nut meshing with the screw-thread upon said horizontal feed screw-bolt, the hub of said cone-pulley with the nut inserted therein filling the space between two adjacent boxes, affording bearings for said horizontal feed screw-bolt; a countershaft provided with a pulley engaging the belt for giving motion to the said driving-pulley; an elongated pulley upon said counter-shaft in vertical alinement with said cone-pulley; a band, or cord, for transmitting motion from said elongated pulley to said cone-pulley; a weighted idler-roller suspended in a bight of said cord or band; a guide-pulley between said cone-pulley and said elongated pulley for facilitating the formation of said bight; a manually-adjustable horizontally-sliding frame carrying said guide-pulley for shifting said cord, or band, from one convolution of said cone-pulley to another convolution thereof, and thereby varying the speed of rotation of said cone-pulley relatively to the speed of rotation of said horizontal feed screw-bolt, and this varying the speed of endwise movement of said mandrel and of the work thereon.

JOHN W. HYATT.

Witnesses:
   A. M. JONES,
   E. GATTERER.